US009669344B2

(12) United States Patent
Heidenreich et al.

(10) Patent No.: US 9,669,344 B2
(45) Date of Patent: Jun. 6, 2017

(54) HOT GAS FILTRATION SYSTEM AND PROCESS FOR REGENERATING SAID SYSTEM

(71) Applicant: Pall Corporation, Port Washington, NY (US)

(72) Inventors: Steffen Heidenreich, Stimpfach (DE); Walter Haag, Stimpfach (DE)

(73) Assignee: Pall Corporation, Port Washington, NY (US)

( * ) Notice: Subject to any disclaimer, the term of this patent is extended or adjusted under 35 U.S.C. 154(b) by 149 days.

(21) Appl. No.: 13/775,290

(22) Filed: Feb. 25, 2013

(65) Prior Publication Data

US 2013/0220125 A1    Aug. 29, 2013

(30) Foreign Application Priority Data

Feb. 28, 2012 (EP) .................................. 12 157 260

(51) Int. Cl.
*B01D 46/00* (2006.01)
*B01D 46/24* (2006.01)

(52) U.S. Cl.
CPC ..... *B01D 46/0068* (2013.01); *B01D 46/2407* (2013.01); *B01D 2273/20* (2013.01)

(58) Field of Classification Search
CPC ............ B01D 46/0068; B01D 46/2407; B01D 2273/20; B01D 46/00
(Continued)

(56) References Cited

U.S. PATENT DOCUMENTS

| 3,498,030 A | * | 3/1970 | Wilki ................. B01D 46/0068 55/302 |
| 5,143,530 A | | 9/1992 | Haldipur et al. |

(Continued)

FOREIGN PATENT DOCUMENTS

| CN | 1351512 A | 5/2002 |
| GB | 2 293 778 A | 4/1996 |

(Continued)

OTHER PUBLICATIONS

Extended European Search Report, Application No. 12157260.6, dated Jun. 22, 2012.

(Continued)

*Primary Examiner* — T. Bennett McKenzie
(74) *Attorney, Agent, or Firm* — Jeremy Jay

(57) ABSTRACT

The present invention relates to a hot gas filtration system and a process for regenerating such a hot gas filtration system, said filtration system comprising a filter vessel, a tubesheet separating the interior of said filter vessel into a raw gas section and a clean gas section, and a plurality of filter elements. Said filter elements, arranged in two or more groups, are connected to the tubesheet with a clean end and extend with a raw gas portion into the raw gas section. Two or more plenum chambers are accommodated in the clean gas section and groupwise accommodate the clean gas ends of the filter elements, each of said plenum chambers comprising a gas exchange opening providing a direct fluid communication with the clean gas section. The hot gas filtration system furthermore comprises a blowback arrangement comprising a blowback gas reservoir and a blowback gas pipe for each group of filter elements, said blowback gas pipes having an outlet positioned in said clean gas section of the vessel, said outlet of the blowback gas pipes being directed at the gas exchange opening of the plenum chambers, said outlet of said blowback pipe having a free cross- (Continued)

sectional area of from about 10% to about 90% of the free cross-sectional area of said gas exchange opening.

10 Claims, 9 Drawing Sheets

(58) Field of Classification Search
USPC ............. 95/280; 55/341.1–341.7, 300–302, 55/361–382
See application file for complete search history.

(56) References Cited

U.S. PATENT DOCUMENTS

| | | | |
|---|---|---|---|
| 5,433,771 A | | 7/1995 | Bachovchin et al. |
| 5,752,999 A | * | 5/1998 | Newby ................ B01D 46/002 55/350.1 |
| 5,876,471 A | | 3/1999 | Lippert et al. |
| 6,214,072 B1 | * | 4/2001 | Kappeler ............. B01D 39/202 55/302 |
| 6,658,988 B1 | | 12/2003 | Dries et al. |
| 6,736,881 B2 | | 5/2004 | Leibold et al. |
| 2002/0014156 A1 | * | 2/2002 | Leibold ............. B01D 46/0024 95/280 |
| 2003/0089234 A1 | * | 5/2003 | Bjarno ............... B01D 46/0068 95/280 |
| 2005/0160707 A1 | * | 7/2005 | Dries .................. B01D 46/002 55/418 |

FOREIGN PATENT DOCUMENTS

| | | | | |
|---|---|---|---|---|
| GB | 2293778 A | * | 4/1996 | ........... B01D 46/002 |
| JP | 61-153121 A | | 7/1986 | |
| JP | 64-52524 U | | 3/1989 | |
| JP | 2002-542011 A | | 12/2002 | |
| JP | 2003-500185 A | | 1/2003 | |
| JP | 2004-290769 A | | 10/2004 | |
| KR | 10-1999-0087079 | | 12/1999 | |
| TW | 276187 | | 5/1996 | |
| WO | 97/30774 A1 | | 8/1997 | |
| WO | WO 00/71231 A1 | | 11/2000 | |

OTHER PUBLICATIONS

Office Action, Chinese Application No. 201310060682.0, dated Aug. 1, 2014.
Exam Report of Taiwanese Application No. 102105022, dated Apr. 30, 2015.
Lloyd, B. T., Conference Contribution "Experiences . . . , Industrial Processes," *5th International Symposium on Gas Cleaning at High Temperatures*, published on Sep. 18, 2002 , printed from internet Apr. 15, 2015.

* cited by examiner

FIG.2A
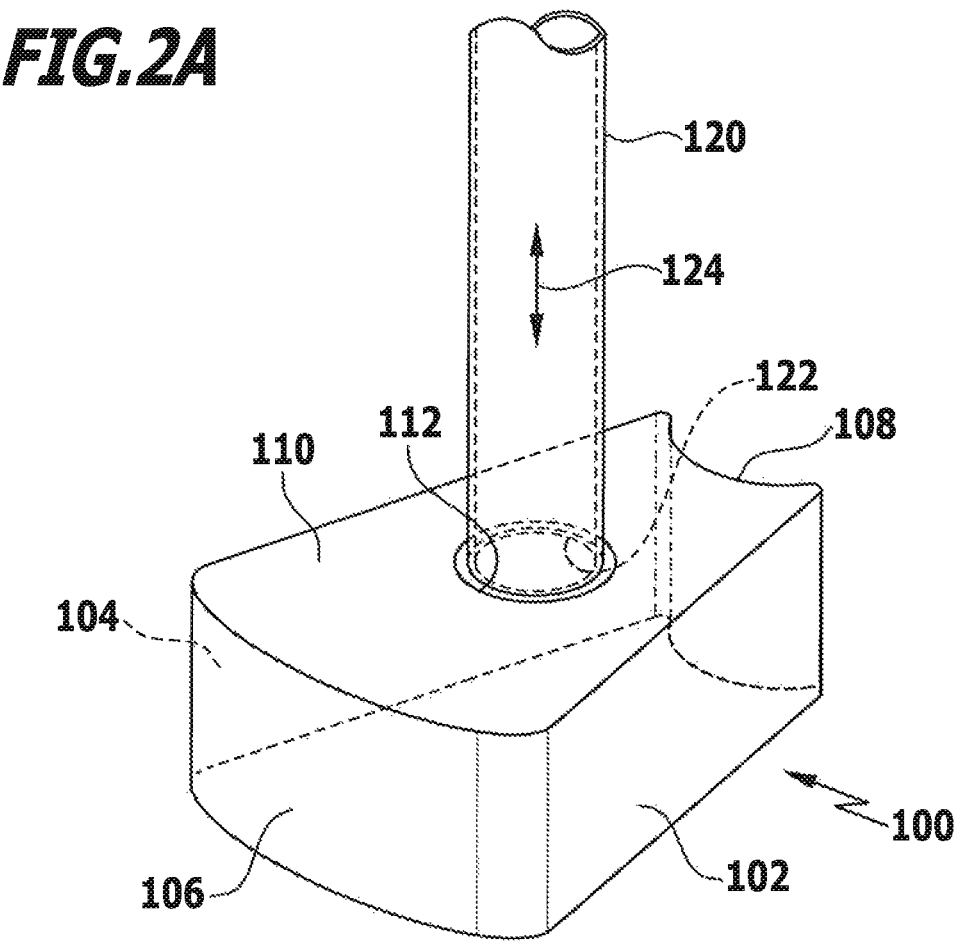
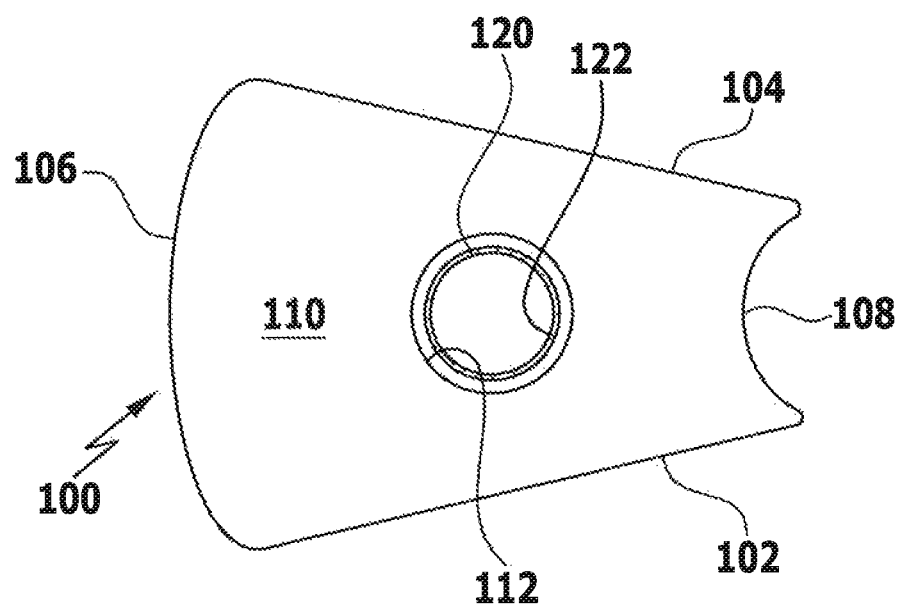

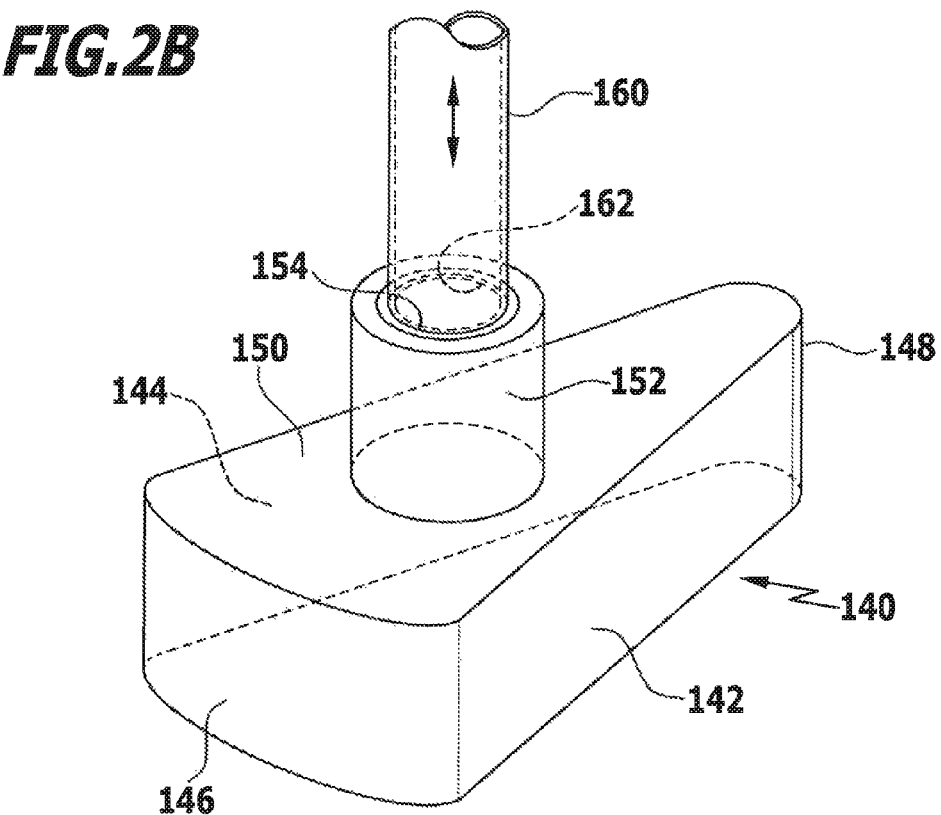
FIG.2B
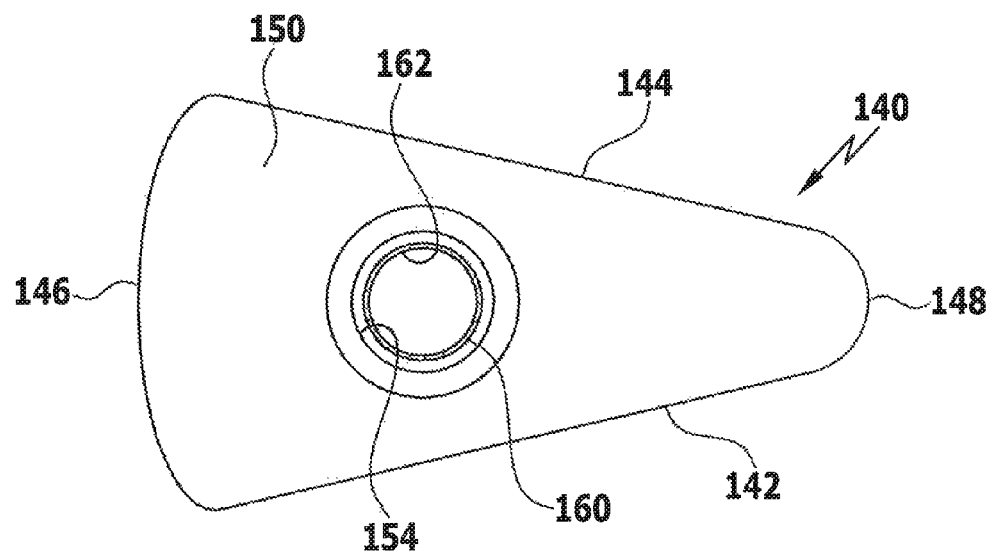

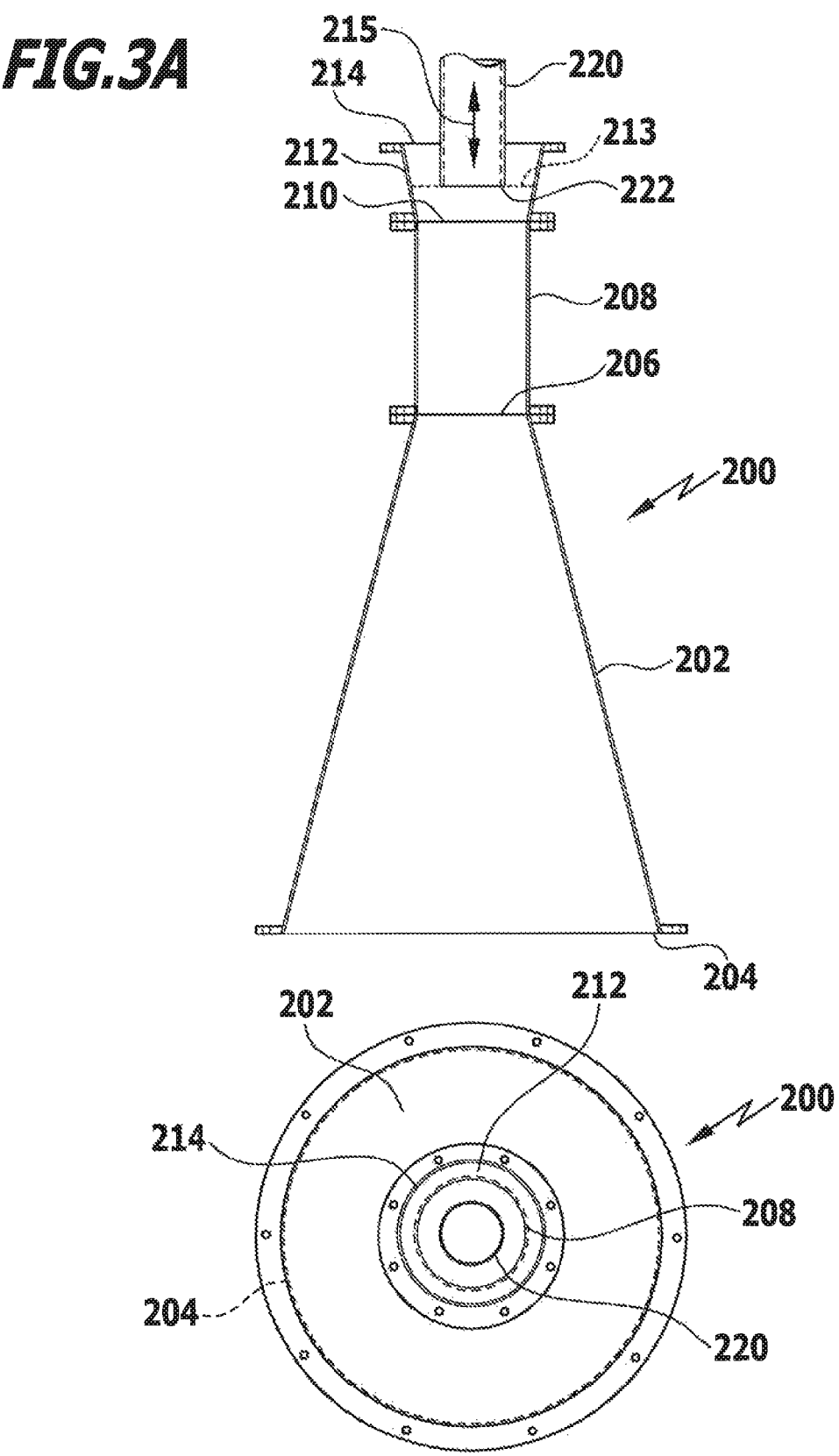

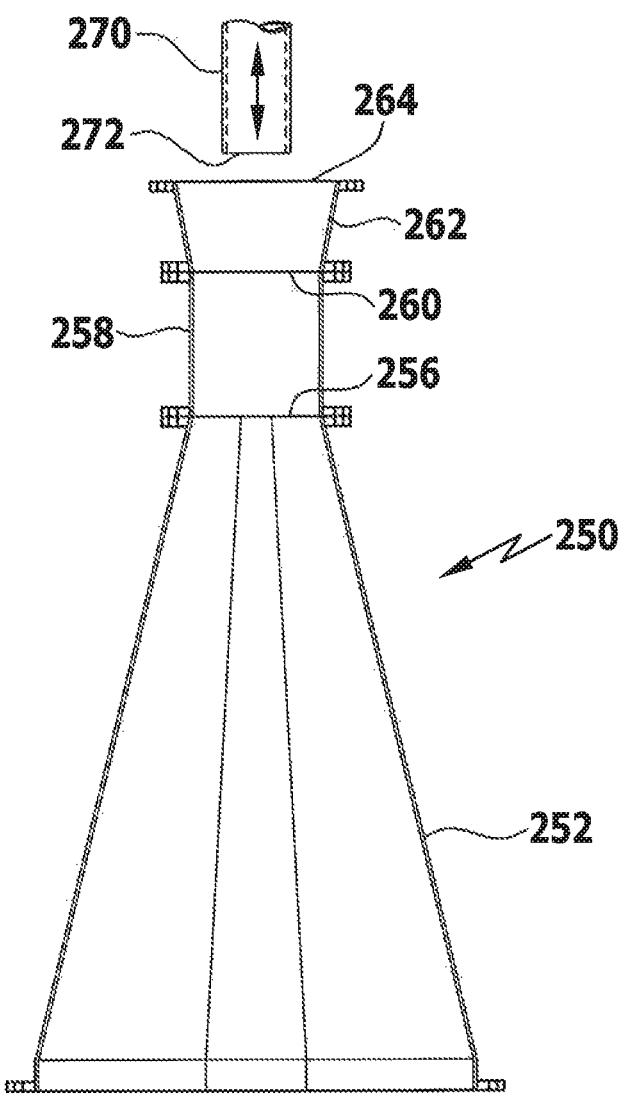
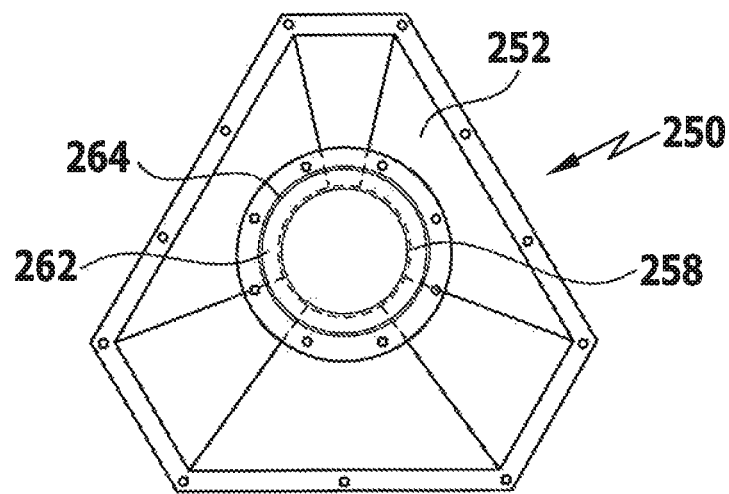
FIG.3B

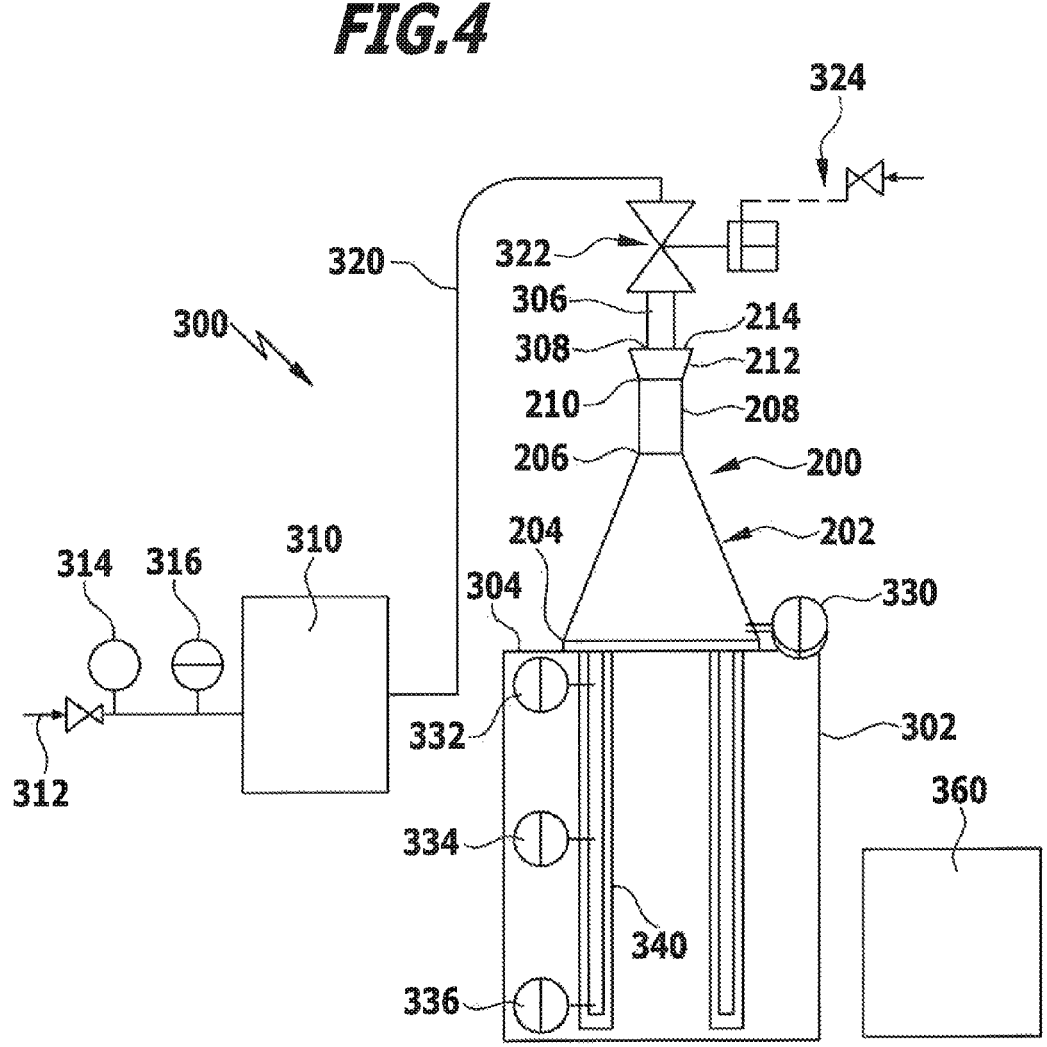

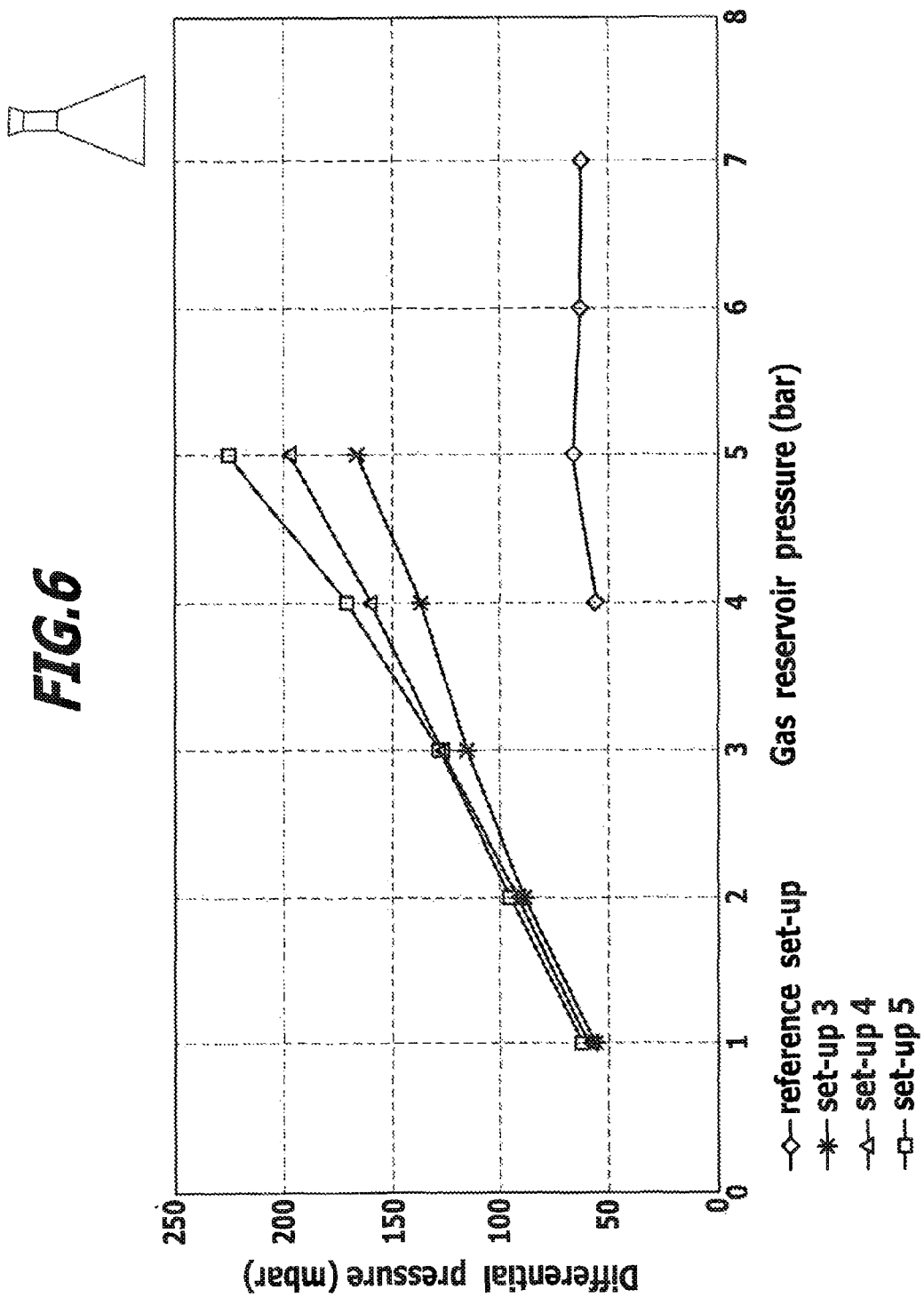

HOT GAS FILTRATION SYSTEM AND PROCESS FOR REGENERATING SAID SYSTEM

The present invention relates to a hot gas filtration system comprising a filter vessel, a tubesheet separating the interior of said filter vessel into a raw gas section and a clean gas section, said filter vessel comprising at its raw gas section a raw gas inlet and at its clean gas section a clean gas outlet, and a plurality of filter elements having a raw gas portion and a clean gas end. Said filter elements are connected to the tubesheet with their clean ends and extend with their raw gas portions into the raw gas section of the interior of said vessel. The hot gas filtration system furthermore comprises a blowback arrangement for regenerating the filter elements.

The invention furthermore relates to a process for regenerating such a hot gas filtration system.

BACKGROUND OF THE INVENTION

Typically, a raw gas stream to be filtered by the hot gas filtration system enters the filter vessel via said raw gas inlet, passes through said plurality of filter elements while contaminants comprised in the raw gas stream are collected on the upstream surface of the raw gas portions of the filter elements. Clean gas exits the filter elements at their clean gas ends, enters into the clean gas section, and a clean gas stream is discharged from the vessel via said clean gas outlet.

From time to time, the contaminants collected at the upstream side of the filter elements are removed therefrom by a blowback gas pulse generated by said blowback arrangement in a regeneration process. The detached contaminants are collected and discharged from the raw gas section of the filter vessel. The long-term performance of the hot gas filtration system crucially depends on the effectiveness of the regeneration process. Regeneration of the filter elements may be hindered by formation of bridges of contaminants between the upstream surfaces of adjacent filter elements increasing the risk of failure or breakage of the filter elements.

Hot gas filtration systems of the afore-described type often require huge dimensions. A filter vessel may very well have a diameter of about 4 m, a height of about 14 in and accommodate 1000 filter elements or more.

Typically, filter elements are made of a ceramic material and have a length of about 1.5 to 2.5 m and an outer diameter of about 60 mm. Alternatively, the filter elements may be made of metal. Such filter elements may have an even greater length. An exemplary filter vessel including the tubesheet and the filter elements may have a weight of roughly 100 metric tons.

In the hot gas filtration system according to U.S. Pat. No. 5,143,530, the particuate matter is deposited on the exterior (upstream) surface of a plurality of filter candle type filter elements. The plurality of filter elements is divided into a number of groups of filter elements. The clean gas ends of the filter elements of each group are connected to separate filtrate chambers which are in fluid communication with a clean gas outlet. During the regeneration process, a cleaning gas pulse is introduced into a blowback supply line and split into a number of cleaning gas streams corresponding to the number of groups of filter elements and filtrate chambers.

U.S. Pat. No. 5,752,999 suggests a hot gas filtration system where, in contrast to U.S. Pat. No. 5,143,530, raw gas is fed into the interior of filter candles, so that particulate matter comprised in the raw gas accumulates within the filter elements, thereby avoiding the formation of bridges of particulate contaminants between adjacent filter elements. In order to regenerate the filter elements, a pulse of clean gas is injected to discharge the accumulated particulate matter from within the filter elements. The plurality of filter elements is divided into several groups of filter elements, each group being accommodated in a plenum chamber.

Since the plenum chamber accommodates the whole of the filter elements, such concept significantly increases the manufacturing costs.

In addition, the use of the inner surface of the filter candles instead of the outer surface for collecting the contaminants comprised in the raw gas the available filtering (upstream) surface and, consequently, the filtration capacity of the system is substantially decreased. Therefore, the regeneration process has to be performed more frequently.

According to US patent application 2002/0014156 A1, the filter elements of a hot gas filtration system are provided at their clean gas ends with so-called safety fuses which provide additional safety in case of breakage of one of the filter elements. The filtration system further comprises a clean gas outlet with a closure element in the form of a flow-dynamic control element which blocks the clean gas outlet of the vessel automatically when a backflushing gas pulse is fed into the clean gas section of the interior of the filter vessel. This filtration system makes use of high speed valves having very short switching times of about several 10 msec. The flow-dynamic control element inevitably presents a noticeable resistance to the flow of clean gas.

BRIEF SUMMARY OF THE INVENTION

The object of the present invention resides in providing a hot gas filtration system with improved blowback characteristics and having a more simple structure, and allows manufacturing at reasonable costs.

The object of the present invention is solved by a hot gas filtration system according to claim 1.

The interior of a filter vessel typically used in the inventive hot gas filtration system is of a roughly cylindrical shape. The interior of the filter vessel is most often divided into a raw gas section and a clean gas section by one tubesheet which accommodates the filter elements.

According to the present invention, the plurality of filter elements is arranged in two or more groups of two or more filter elements which are connected to a common tubesheet. Furthermore, within the clean gas section of the interior of the filter vessel, two or more plenum chambers are provided and accommodate the clean gas ends of the two or more groups of filter elements. Typically, the plenum chambers are supported by the tubesheet.

The plenum chambers comprise a gas exchange opening which provides a direct fluid communication of the interior of each plenum chamber with the clean gas section of the interior of the filter vessel. During normal filtration operation of the filtration system clean gas is discharged to the clean gas section of the vessel via the gas exchange opening. Typically the gas exchange opening will be arranged in a central portion of the plenum chamber.

The inventive hot gas filtration system further includes a blowback arrangement comprising a separate blowback gas pipe for each plenum chamber, i.e., for each group of filter elements.

The outlet of a blowback gas pipe is directed to the gas exchange opening of a plenum chamber, and the blowback gas stream is delivered to the gas exchange opening of the respective plenum chamber and distributed within the plenum chamber to the various filter elements of said group of filter elements.

The filtration system of the present invention allows regeneration of an individual group or several groups of filter elements during the continued operation of the hot gas filtration system.

The design of the outlet opening of the blowback pipes, i.e., their free cross-sectional area as compared to the free cross-sectional area of the gas exchange opening of a plenum chamber according to the present invention, allows use of large confined jet pulses instead of sonic jet pulses.

The hot gas filtration system according to the present invention allows for very high cleaning intensities and provides a high flexibility with respect to the cleaning intensities which may be varied over a wide range by adjusting the blowback gas pressure.

According to a preferred embodiment of the present invention, the free cross-sectional area of the blowback gas pipe amounts to about 12% or more of the free cross-sectional area of the gas exchange opening of the plenum chamber, more preferably to about 15% to about 50%, even more preferably to about 20% to about 40%.

According to another preferred embodiment of the present invention, said outlet of said blowback gas pipe is positioned at about the upper end of the inlet opening of said plenum chamber, optionally about flush with the upper end of the gas exchange opening.

In an alternative preferred embodiment, the blowback pipe is arranged such that its outlet extends into the inlet opening of the plenum chamber.

In both alternative arrangements of the outlet of the blowback gas pipe with respect to the gas exchange opening of a plenum chamber, the space provided between the outlet of said blowback gas pipe and the gas exchange opening is large enough to let clean gas pass through during normal filtration operation of the system without substantially hindering gas flow.

The plenum chambers used to incorporate or accommodate the clean gas ends of a group of filter elements may have various configurations.

According to a first alternative, the plenum chamber may have a circular configuration in a plane which is in parallel to the tubesheet surface. Typically, the groups of filter elements accommodated by the plenum chambers are then arranged in circular areas of the tubesheet.

According to a further preferred embodiment, the plenum chamber has a non-circular configuration in a plane which is in parallel to the surface of the tubesheet, e.g., an approximated triangular cross-sectional configuration, or a configuration which corresponds to about a segment of a circle. These configurations of the plenum chamber allow connecting a larger number of filter elements to the tubesheet. The filtration capacity of the filtration system is thereby maximized.

More preferably, the configuration of a segment of a circle and the approximated triangular configuration of the plenum chamber, respectively, are designed without acute angles, which facilitates an even distribution of the blowback gas stream to all of the filter element of a group of filter elements. Instead, the corners of the plenum chamber may be chamfered or truncated.

The side walls of a plenum chamber placed around a group of filter elements may be oriented at a right angle with respect to the surface of the tubesheet surface. The plenum chamber may be covered by a flat or dome-shaped top wall incorporating the gas exchange opening in a central portion thereof.

As an alternative, the plenum chamber as a whole may be designed dome-shaped and incorporate the gas exchange opening in a central portion thereof.

According to a further alternative, the plenum chamber may be designed in a tapered or conical form and incorporate the gas exchange opening in a central portion thereof.

The gas exchange opening may also have different configurations. The free cross-sectional area parallel to the tubesheet surface typically will be circular.

In its simplest design, the gas exchange opening is about tubular. It may be formed as an integral part of the top wall of the plenum chamber. Alternatively, it can be arranged at the upper end of a tubular structure extending from a central part of the top wall of the plenum chamber into the clean gas section of the filter vessel.

According to a further alternative, the gas exchange opening may be designed with a tapered form, the larger cross-sectional area being exposed to the clean gas section of the filter vessel. The relation of the free cross-sectional areas has then to be calculated on the basis of the free cross-sectional area of the gas exchange opening at the level where the blowback pipe outlet is positioned. In case the blowback pipe outlet is positioned somewhat above the upper end of the gas exchange opening than the free cross-sectional area of the upper end of the gas exchange opening is the basis for calculating the percentage.

The blowback arrangement of the preferred hot gas filtration system includes blowback valves which allow to individually connect the blowback gas pipes to the blowback gas reservoir. Preferred blowback valves have a nominal diameter in relation to the inner diameter of the blowback gas pipes of from about 0.8 to about 1.1, more preferably of from about 0.9 to 1.1.

Furthermore, preferably the blowback gas pipe valves are selected from blowback valves having an opening time of about 400 msec or less, more preferably of about 200 msec or less. However, ultra-high speed valves with opening times of several 10 msec are not necessary for a successful operation of the inventive filtration system. The opening time characterizes the time period needed to bring the valve from a completely closed in a completely open state.

In order to increase the safety of the operation of the inventive hot gas filtration system, it is advisable to provide each filter element with a safety fuse. Typically, the safety fuses will be connected to the clean gas ends of the filter elements. Preferably, the safety fuses are arranged coaxially with the filter elements.

According to the present invention, the preferred blowback arrangement is preferably designed to provide pulses of blowback gas to the plenum chambers.

More preferably, the jet pulses provided by the blowback arrangement are directed to the gas exchange openings of the plenum chambers such that a volume of clean gas of the clean gas section is sucked into the plenum chamber by the blowback gas stream. As mentioned before, the jet pulses are preferably delivered as a non-sonic jet pulses to the gas exchange openings of the plenum chambers.

The invention furthermore relates to a process for regenerating a hot gas filtration system, the process comprising providing a non-sonic jet pulse of blowback gas from the blowback gas reservoir via the blowback gas pipes into the plenum chamber of at least one group of filter elements.

Preferably, the non-sonic jet pulses are delivered to the gas exchange opening of a plenum chamber such that it sucks in clean gas from the clean gas section into the plenum chamber.

It is furthermore preferred that the jet pulses are provided to a fraction of groups of filter elements during continued filtration operation of the remainder of the groups of filter elements.

The foregoing and other aspects, embodiments, objects and features of the present invention can be more fully understood from the following description in conjunction with the drawings and examples.

BRIEF DESCRIPTION OF THE SEVERAL VIEWS OF THE DRAWINGS

FIGS. 2A and 2B show two embodiments of a plenum chamber for an inventive hot gas filtration system in perspective and a top view;

FIGS. 3A and 3B show two further embodiments of a plenum chamber for an inventive hot gas filtration system in a perspective and a top view;

FIG. 4 shows schematically a testing environment for evaluating the regeneration characteristics of the inventive hot gas filtration system;

FIG. 6 shows a diagram of obtainable pressure differentials at a group of filter elements for a second set of testing conditions compared with a prior art device.

DETAILED DESCRIPTION OF THE INVENTION

Figure 1A:
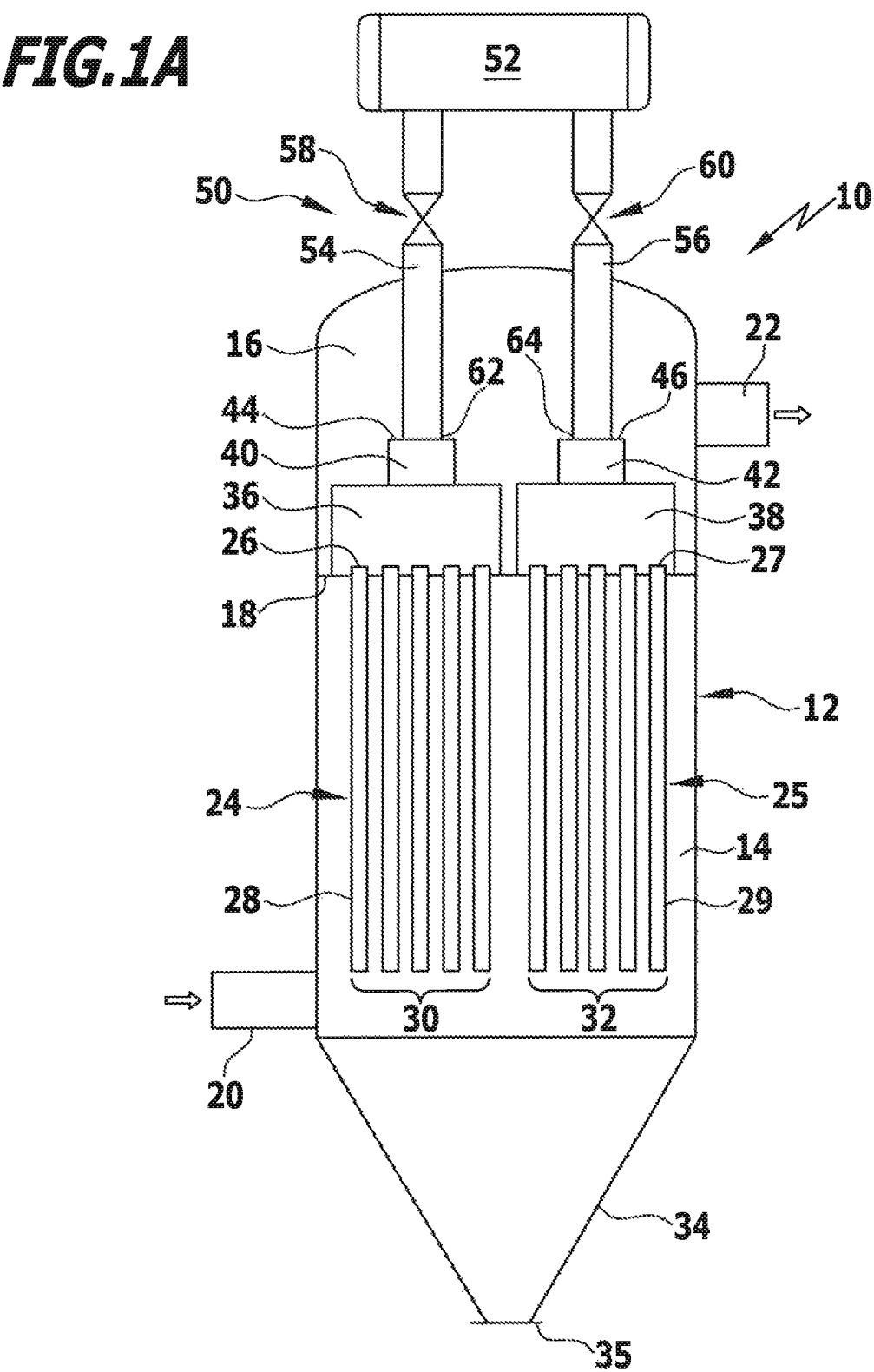
FIGS. 1A and 1B show two different embodiments of an inventive hot gas filtration system in a schematic representation.

FIG. 1A shows a hot gas filtration system 10 according to the present invention comprising a filter vessel 12 which is of a substantially cylindrical shape. The interior of the filter vessel 12 is divided into a raw gas section 14 and a clean gas section 16 by a tubesheet 18.

The filter vessel 12 comprises in its raw gas section 14 a raw gas inlet 20 which is in fluid communication with the raw gas section 14.

On its upper portion, the filter vessel 12 comprises a clean gas outlet 22 which is in fluid communication with the clean gas section 16.

The tubesheet 18 extending over the whole cross-sectional area of the filter vessel 12 comprises a plurality of openings (not shown in detail) each of which accommodates a filter element 24 and 25, respectively. The filter elements 24 comprise a clean gas end 26 and a raw gas portion 28, the clean gas ends 26 are connected to the tubesheet 18 whereas the raw gas portions 28 extend from the tubesheet 18 downwards into a raw gas section 14 of the filter vessel 12. Similarly, the filter elements 25 have clean gas ends 27 which are accommodated in the tubesheet 18 and raw gas portions 29 extending into the raw gas section 14 of the filter vessel 12.

The plurality of filter elements 24, 25 is subdivided into a plurality of groups (in FIG. 1A, the group of filter elements 24 is shown and designated with reference numeral 30, the group of filter elements 25 is referenced with reference numeral 32).

In the lower portion of the filter vessel 12, a conically shaped portion 34 is provided which closes the lower end of filter vessel 12 and comprises an outlet 35 for particulate contaminant matter.

On top of the tubesheet 18, two plenum chambers 36, 38 are mounted each of which accommodates the clean gas ends 26, 27 of one group of filter elements 30 and 32, respectively.

In a central position of the top wall of each plenum chamber 36, 38, a tubular extension 40, 42 is mounted the upper end of which provides a gas exchange opening 44 and 46, respectively.

Raw gas entering the raw gas inlet 20 of the filter vessel 12 is filtered by the plurality of filter elements 24, 25 and penetrates through the porous structure of the tubular filter elements 24, 25 whereby contaminants comprised in the raw gas are removed from the gas so that in the interior of the filter elements 24, 25 clean gas is accumulating which is discharged via the clean gas ends 26 and 27, respectively, into the plenum chambers 36 and 38, respectively. The filter elements may be made of a sintered ceramic material or of metal.

From the plenum chambers 36, 38 the clean gas exits into the clean gas section 16 via the gas exchange openings 44 and 46. From the clean gas section 16, the clean gas is discharged via the clean gas outlet 22 from the filter vessel 12.

Depending on the amount of contaminants contained in the raw gas fed into raw gas inlet 20, the filter elements 24 and 25 need to be regenerated more or less frequently in order to remove the contaminants attached to the upstream surface of the filter elements 24, 25 and avoid building of bridges of contaminant material between adjacent filter elements 24 and 25, respectively. For detaching a contaminant material adhering to the upstream surface of the filter elements 24 and 25, a blowback arrangement 50 is provided which comprises a blowback gas reservoir 52 which holds, for example, air at a high pressure of about, e.g., 1 to 5 bar. The blowback arrangement 50 comprises blowback pipes 54, 56 which are connected to the blowback gas reservoir 52 via blowback gas valves 58, 60.

These blowback valves 58, 60 are separately operable and independent of each other, so that high pressure gas from the gas reservoir 52 may be delivered via the blowback gas pipes 54 and 56, respectively, via the outlet ends 62, 64 of the blowback gas pipes 54, 56 which are directed to the gas exchange openings 45, 46 of the plenum chambers 36 and 38, respectively.

By operating the blowback gas valves 58 or 60, the groups 30 and 32 of filter elements 24 or 25 may be regenerated independently from one another by a blowback gas pulse delivered from the gas reservoir 52 via the blowback gas valves 58 and 60 and the blowback pipes 54 and 56. The gas pulses are delivered to the plenum chambers 36 and 38 through their gas exchange openings 44 and 46.

The free cross-sectional area of the gas exchange openings 44 and 46 are larger than the free cross-sectional area of the outlet ends 62, 64 of the blowback gas pipes 44 and 46, respectively. The free cross-sectional area of the outlet openings of the blowback pipes 54 and 56 amount, e.g., to about 12% to 90% of the free cross-sectional area of the gas exchange opening of the respective plenum chamber. The outlet ends 62, 64 of the blowback gas pipes 54, 56 are not sealed to the gas exchange openings 44 and 46 so that a gap in between the outlet ends 62 and 64 and the respective gas exchange openings 44 and 46 exists which allows clean gas to exit the plenum chambers 36, 38 during normal filtration operation substantially unimpeded.

By delivering a blowback gas pulse to the plenum chamber 36 or 38, gas from the clean gas section 16 is drawn into the plenum chamber 36 or 38 through the gap between the outlet ends 62, 64 and the gas exchange openings 44 and 46, respectively, thereby increasing the gas volume fed into the plenum chamber and subsequently into the group of filter elements 24 or 25.

The present invention need not to make use of sonic or supersonic jet pulses when delivering the gas from the blowback gas reservoir 52 to the plenum chambers 36 and 38, but rather large confined pulses the volume of which is increased by the clean gas sucked in from the clean gas section 16 provide satisfactory regeneration effects.

Because of this arrangement, very high cleaning intensities can be provided, and there is a high flexibility for adjusting the cleaning intensities over a wide range by modifying the blowback gas pressure.

The particulate contaminants adhering to the filter elements 24 and 25 on their upstream surface is detached by the blowback gas pulses delivered to the plenum chambers 36 and 38 and subsequently to the interior space of the tubular filter elements 24 and 25. The contaminant material is detached from the upstream surfaces of these filter elements 24 and 25 conveyed by gravity into the lower conical portions 44 of the filter vessel 12 may be removed by a closeable particulate outlet 35 (not shown in detail).

Figure 1B:
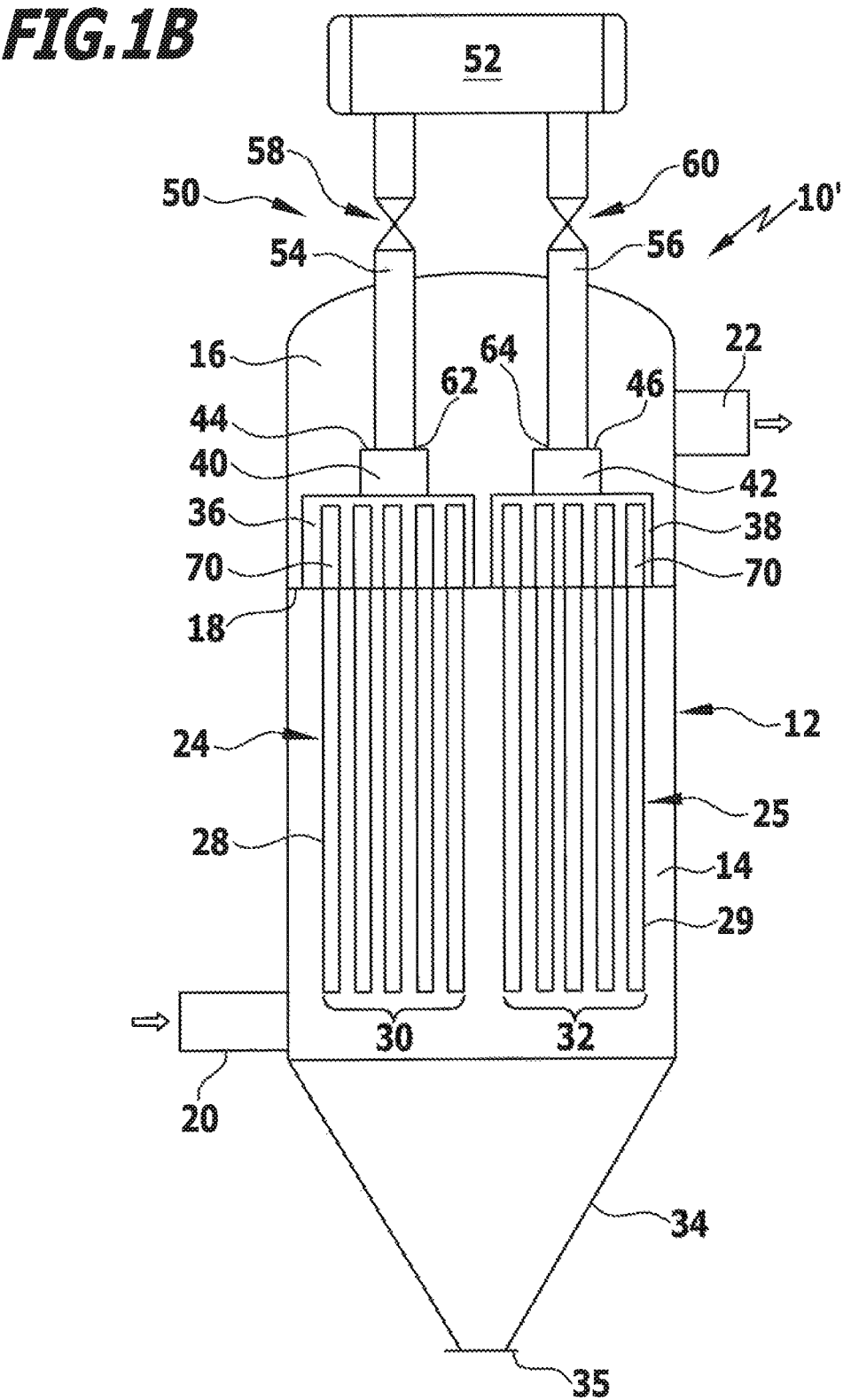

FIG. 1B shows a hot gas filtration system 10' according to the present invention which corresponds substantially to the hot gas filtration system shown in FIG. 1A. Therefore, like parts are designated with the same reference numerals.

However, in addition to the structural characteristics of the hot gas filtration system 10 of FIG. 1A, the hot gas filtration system 10' comprises a plurality of safety fuses 70 in the form of tubular ceramic filter elements the porosity of which is larger than the porosity of the filter elements 24 and 25.

The safety fuses 70 are mounted coaxially on the clean gas ends 26 and 27 of the filter elements 24 and 25, respectively.

Raw gas entering the raw gas inlet 20 of filter vessel 12 is filtered by the plurality of filter elements 24, 25 and penetrates through the porous structure of the tubular filter elements 24, 25 whereby contaminants comprised in the raw gas are removed from the gas so that in the interior of the filter elements 24, 25 clean gas is accumulating, which is discharged via the clean gas ends 26 and 27, respectively. Before the clean gas exits from the filter elements 24, 25 into the plenum chambers 36 and 38, respectively, the clean gas has to pass through the safety fuses 70. Because of their larger porosity, the safety fuses 70 do not substantially increase the pressure drop.

From the plenum chambers 36, 38, the clean gas exits into the clean gas section 16 via the gas exchange openings 44 and 46. From the clean gas section 16, the clean gas is discharged via the clean gas outlet 22 from the filter vessel 12 as is the case for the hot gas filtration system 10 of FIG. 1A.

For detaching a contaminant material adhering to the upstream surface of the filter elements 24 and 25, the blowback arrangement 50 is operated the same way as it has been described for the hot gas filtration system 10 above.

Blowback gas is delivered via the outlet ends 62, 64 of the blowback gas pipes 54, 56 which are directed to the gas exchange openings 45 and 46, respectively, of the plenum chambers 36, 38, respectively. The blowback gas penetrates through the safety fuses 70 and then enters into the interior of the filter elements 24, 25.

Because of the larger porosity of the safety fuses 70, very high cleaning intensities can also be provided for the hot gas filtration system 10', and again a high flexibility for adjusting the cleaning intensities over a wide range by modifying the blowback gas pressure exists.

FIG. 2A shows in detail a plenum chamber 100 of an inventive hot gas filtration system in a first exemplary embodiment, the plenum chamber 100 having a cross-sectional configuration when viewed in parallel to the surface of the tubesheet of the filter vessel of a section of a circle.

The plenum chamber 100 is composed of two straight side walls 102, 104 and an outer and an inner arcuate side wall 106, 108. The side walls 102, 104, 106, 108 are arranged at a right angle to the surface of the tubesheet (not shown). The plenum chamber 100 is terminated at its upper end by a top wall 110. The top wall 110 of the plenum chamber 100 incorporates at a central position a gas exchange opening 112 which allows clean gas exiting from the clean gas ends of the group of filter elements accommodated within the plenum chamber 100 to exit from the plenum chamber 100 into the clean gas section of the interior of the filter vessel.

On top of the plenum chamber 100, the lower part of a blowback gas pipe 120 is shown, the outlet 122 of which is directed to the gas exchange opening 112 of the plenum chamber 100.

The opening 122 of the blowback gas pipe 120 is shown in FIG. 2A to be about flush with the upper end of the gas exchange opening 112 of the plenum chamber 100. According to the needs of a specific application or environment of a hot gas filtration system according to the present invention, the blowback gas pipe 120 may be mounted at different vertical positions as indicated by the double pointed arrow 124. It is of importance that the cross-sectional area of the opening 122 of the blowback gas pipe 120 amounts, e.g., to about 12% to about 90% of the cross-sectional area of the gas exchange opening 112 of the plenum chamber 100.

In the present example, the cross-sectional area of the opening 122 of the blowback gas pipe 120 roughly amounts to about 70%.

As may be derived from the top view of the plenum chamber 100 comprised in FIG. 2A, the side walls 102, 104 are arranged at an angle of about 25°, so that on the circular surface of a tube sheet of a filter vessel up to 14 of the plenum chambers 100 may be positioned, accommodating 14 groups of filter elements.

FIG. 2B shows a second alternative of a plenum chamber 140 to be used in an inventive hot gas filtration system. Similarly to what is shown in FIG. 2B, the plenum chamber 140 of FIG. 2B is comprised of two flat or straight side walls 142, 144 which are arranged in an angle of about 25%.

Two arcuate side walls 146 and 148 complement the basic structure of the plenum chamber 140. A top wall 150 closes the upper portion of the plenum chamber 140. The lower end of the plenum chamber 140 abuts the upper surface of a tubesheet (not shown).

The plenum chamber 140 differs from the plenum chamber 100 shown in FIG. 2A in that the arcuate side wall 148 is bulging outwardly, whereas the side wall 108 of plenum chamber 100 is bulging inwardly.

By having the side wall 140 bulging outwardly, additional area of the tubesheet is covered by the plenum chamber 140 and thereby additional filter elements of a group of filter elements can be accommodated within the plenum chamber 140.

The alternative configuration of the side wall 108 in FIG. 2A is used in case the raw gas inlet of a filter vessel is entering into the filter vessel and discharging the raw gas in an upwardly extending part of a pipe at about the centre of the filter vessel which in such a case is left void of filter elements.

Another difference to the plenum chamber 100 is given in that the plenum chamber 140 comprises a gas exchange opening not as part of the top wall 150. Instead, at a central portion of the top wall 150, a tubular element 152 is mounted which extends upwardly from top wall 150. At its upper end, the tubular element 152 defines the gas exchange opening 154 of the plenum chamber 140. A blowback pipe 160 is extending in the direction to the gas exchange opening 154 of the plenum chamber 140, the lower end of which defining the outlet opening 162. Again, the free cross-sectional areas of the gas exchange opening 154 and the opening of the lower end of the blowback gas pipe 160 are such that the free cross-sectional area of the opening 162 amounts to about 70% of the free cross-sectional area of the gas exchange opening 154.

In the FIGS. 3A and 3B, a different type of a plenum concept is shown, where instead of a plenum chamber with vertical side walls conically structured plenum chambers are used.

FIG. 3A shows a plenum chamber 200 with a circular cross-section as is apparent from the top view of FIG. 3A.

The plenum chamber 200 is comprised of three different parts, the first, lowest part 202 is shaped as a truncated cone the lower end 204 of which typically rests on a tubesheet of a filter vessel and accommodates the clean gas ends of the filter elements mounted in the tubesheet.

The upper end 206 can, in a first approach, form the gas exchange opening of the plenum chamber which would consist only of the plenum chamber part 202.

In the present example, however, the upper end 206 supports a cylindrical plenum chamber part 208 the upper end 210 of which could also form a gas exchange opening for a plenum chamber which would consist of the plenum chamber parts 202 and 208.

Again, in the example shown in FIG. 3A, a third plenum chamber part 212 is supported by the upper end 210 of the plenum chamber part 208 which, for the specific example shown in FIG. 3A, forms the gas exchange opening 214 of the plenum chamber 200.

Positioned above the plenum chamber 200, a blowback gas pipe 220 is positioned the lower end 222 of which projects into the upper end 214 of the plenum chamber part 212 forming the gas exchange opening. The free cross-sectional area of the plenum chamber part 212 at the level of the line at reference numeral 213 and the free cross-sectional area of the lower end 222 of the blowback pipe 220 serve for calculating the ratio. In the present case, the ratio is about 50%.

It is noted that the vertical position of the lower end 222 of the blowback pipe 220 may be positioned at different levels as indicated by the double pointed arrow 215.

FIG. 3B shows a plenum chamber 250 which has been designed according to similar principles as is the case for the plenum chamber 200 of FIG. 3A.

The lowermost part of the plenum chamber 250 has a basically triangular shape as shown in the top view of FIG. 3B, the corners of the triangle being truncated. Thus excess volume within the plenum chamber 250 which could not accommodate any further clean gas ends of filter elements is avoided, thereby not only limiting the volume contained in the plenum chamber 250, but also providing a more uniform blowback gas distribution within the plenum chamber 250.

The lowermost part 252 could serve, similarly to the lowermost part 202 of the plenum chamber 200, as a plenum chamber per se, whereas the uppermost end 256 would then form and define the gas exchange opening for such a plenum chamber.

However, in the example of FIG. 3B, on the uppermost end 256 of the plenum chamber part 252, a cylindrical plenum chamber part 258 is mounted, the upper end 260 of which could also serve as a gas exchange opening for the whole of the plenum chamber, in such a case the plenum chamber would consist of the plenum chamber parts 252 and 258 only.

Again and for reasons which will be explained in connection with FIGS. 5 and 6, on the uppermost end 260 of the plenum chamber part 258, a conically shaped and expanding plenum chamber part 262 is mounted which forms the gas exchange opening 264 for the plenum chamber 250 of FIG. 3B the free cross-sectional area of which is used to calculate the cross-sectional ratio when the blowback pipe 270 is positioned with its lower end 272 flush with the upper end 264 or slightly above, as indicated in FIG. 3B.

The free cross-sectional area to be calculated and compared to the free cross-sectional area of the blowback pipe would depend on the position of the end of the blowback pipe with respect to the upper end of the plenum chamber part 262.

FIG. 4 shows a testing device 300 which will be used in connection with the following examples in order to demonstrate the benefit of the present invention as compared to conventional sonic jet pulse-regenerated hot gas filtration systems.

The testing device 300 comprises a vessel 302 the top of which is closed by a tubesheet 304 which accommodates a plurality of filter elements (in the following examples; 48 ceramic filter candles of the type DIA-SCHUMALITH 10-20 of a length of 1.5 m).

On top of the tubesheet 304, a plenum chamber corresponding to the plenum chamber 200 of FIG. 3A is mounted the upper end 214 of which forms the gas exchange opening for the plenum chamber 200 for the examples report in connection with FIG. 6.

Figure 5:
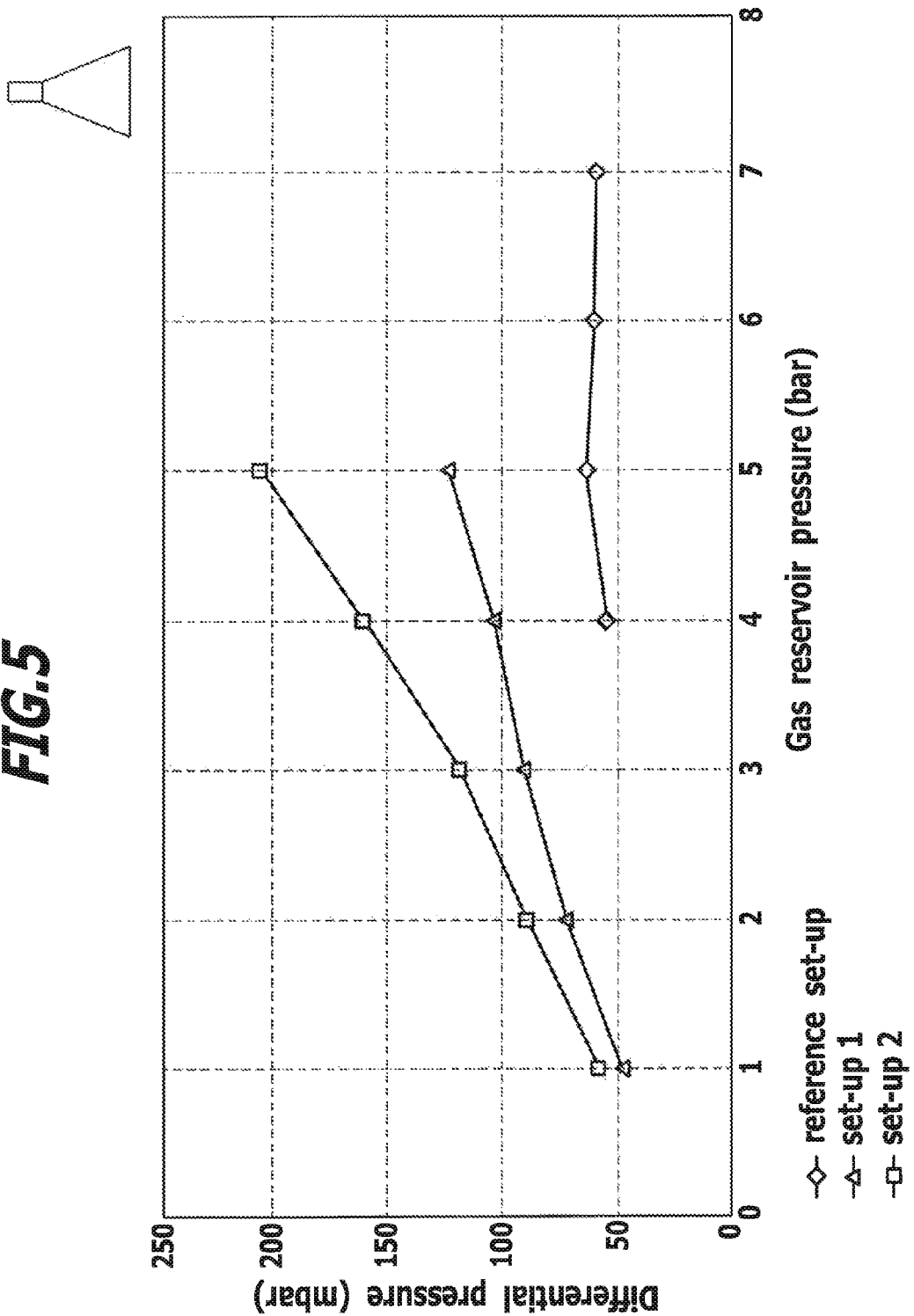
FIG. 5 shows a diagram of obtainable pressure differentials at a group of filter elements for a first set of testing conditions compared with a prior art device.

The test data reported in connection with FIG. 5 result from a set-up where the plenum chamber 200 consisted of the plenum chamber parts 202 and 208 only. The gas exchange opening was then provided by the upper end 210 of the plenum chamber part 208.

The dimensions of the plenum chamber parts of the plenum chamber 200 were as follows:

Chamber part 202, inner diameter at its lower end 204: 730 mm inner diameter at its upper end 206: 210 mm Chamber part 208, inner diameter: 210 mm Chamber part 212, inner diameter at its lower end 210: 210 mm inner diameter at its upper end 214: 270 mm The inner diameter of the blowgas pipe 306 corresponding to the inner diameter at the outlet was modified for the various test set-ups as listed in Table 1 below.

The height of the plenum chamber parts amount to:
1175 mm for chamber part 202
250 mm for chamber part 208
155 mm for chamber part 212

The testing system 300 does not include a clean gas section, and the vessel 302 just provides an environment to the filter elements which corresponds to the raw gas section of a real-world hot gas filtration system. A clean gas section is not needed for obtaining meaningful test results.

A blowback gas pipe 306 is directed to the gas exchange opening of the plenum chamber 200 which is represented in one testing environment by the upper end 210 of the plenum chamber part 208 (the upper most plenum chamber part 212 being removed; the test results are summarized in FIG. 5) and in another testing environment by the upper end 214 of the plenum chamber part 212 (the test results are summarized in FIG. 6). The lower end 308 of the blowback pipe 306 is positioned in each case about flush with the gas exchange opening of the plenum chamber.

The blowback gas pipe 306 receives blowback gas from a blowback gas reservoir 310 of a volume of 1000 l which receives compressed air via feedline 312.

The pressure conditions on the feed side of the blowback gas reservoir 310 are monitored by an optical pressure indicator 314 and a pressure monitoring device 316.

The gas reservoir 310 is connected to the blowback pipe 306 via a feedline 320 of an inner diameter of 250 mm. The feedline 320 includes two 90° bends and is connected to the blowback gas pipe 306 via a pneumatically driven valve 322. The total volume of the feedline 320, the valve 322 and the blowback gas pipe 306 amounts to 130 l. The pneumatic device for operating the valve 322 is schematically shown at reference numeral 324.

In order to monitor the pressure conditions during blowback experiments inside the plenum chamber 200 and the individual filter elements, a plurality of pressure-monitoring instruments 330, 332, 334 and 336 is mounted on the plenum chamber 200 and on one of the filter elements 340.

The data including the pressure data from the pressure monitoring device 316, 330, 332, 334, 336 obtained during the experiments are collected in a computer system schematically shown as part 360.

The test results shown in FIGS. 5 and 6 relate to tests which have been performed at ambient temperature and system pressure. The pressure differential values correspond to the values measured by the pressure monitoring device 336 during a blowback pulse. The blowback gas pressure was varied as is apparent from the graphs of FIGS. 5 and 6.

Test Set-Up for Prior Art System (Reference)

The valve 322 used in the test set-up for the reference system was a DN80 Müller Coax valve (supplier: Müller Co-Ax AG, Germany) having an opening time of about 100 msec.

The blowback pipe 306 had an inner diameter of about 80 mm. At the outlet end of the blowback gas pipe 306 a nozzle with an inner diameter of 40 mm was used. The nozzle was positioned at about 200 mm above the gas exchange opening 214 of the plenum chamber.

The ratio of the free cross-sectional areas was 2.2%.

The blowback gas pulse created by the reference system was of sonic velocity.

Test Set-Up for the Inventive System

The valve 322 used was a DN 150 butterfly valve (supplier: TYCO Valves & Controls Distribution GmbH, Mönchengladbach, Germany) having a nominal diameter of 150 mm and an opening time of about 200 msec.

The blowback gas outlet 308 was positioned flush with the gas exchange opening 210 and 214, respectively.

The blowback gas pulse had roughly a velocity of 90 m/sec for a blowback gas pressure of 1.3 bar in the gas reservoir.

TABLE 1

|  | inner diameter of outlet of blowback gas pipe [mm] | inner diameter of gas exchange opening [mm] | ratio of free cross-sectional areas [%] |
| --- | --- | --- | --- |
| FIG. 5 | | | |
| set-up 1 | 100 | 210 | 22 |
| set-up 2 | 150 | 210 | 51 |
| FIG. 6 | | | |
| set-up 3 | 100 | 270 | 13 |
| set-up 4 | 120 | 270 | 19 |
| set-up 5 | 150 | 270 | 30 |

The pressure differential at the filter candles created in a set-up according to the present invention at different levels of gas reservoir pressure can be varied considerably. About the same pressure differential obtained by a conventional design (reference set-up) where sonic jet pulses are created with a gas reservoir pressure of 4 bar, could be achieved with an inventive set-up with a gas reservoir pressure of 1 bar only. An increase of the gas reservoir pressure up to 5 bar increases dramatically the pressure differential, depending to some extent on the ratio of the free cross-sectional areas of the blow pipe end and the gas exchange opening of the plenum up to significantly more than 220 mbar (set-up 5) while in the reference set-up an increase of the pressure of the gas reservoir from 4 to 7 bar leaves the differential pressure observed at the filter elements substantially unchanged.

As shown in FIG. 5, when the ratio of the free cross-sectional area of the blow pipe outlet and the free cross-sectional area of the gas exchange opening is set to about 22% (set-up 1), for a gas reservoir pressure of 1 bar a differential pressure of 50 mbar at the filter elements is obtained. At an 5 bar pressure level in the gas reservoir the differential pressure increases in set-up 1 to about 130 mbar.

When the free cross-sectional ratio is increased to 51%, the differential pressure may be increased up to more than 200 at a gas reservoir pressure of 5 bar.

For ease of comparison, the prior art test results (reference set-up) are reported in both graphs of FIGS. 5 and 6 for a gas reservoir pressure of 4 up to 7 bar.

In case of the data represented in FIG. 6, the blowback chamber 200 was equipped with the uppermost conical part 212 as is shown in FIG. 4 and in FIG. 3A.

The tests have been performed with three different cross-sectional ratios of the free cross-sectional area of the blowback pipe outlet 308 as compared to the free cross-sectional area of the gas exchange opening 214, and these ratios were 13% for set-up 3, 19% A for set-up 4 and 30% for set-up 5.

Again, the differential pressure could be varied from about 50 mbar with a pressure of the gas reservoir of 1 bar to up to more than 220 mbar at a pressure of the gas reservoir of 5 bar when the cross-sectional ratio was selected to be 30%.

It is noted that the cleaning effect according to the present invention not only can be varied over a very broad range of differential pressures by selecting the gas reservoir pressure, but also a similar amount of cleaning gas volume is needed as compared to the conventional sonic jet pulse system (reference set-up):

For creating a pressure differential of 65 mbar at the filter elements the following conditions were required in set-up 5 and the reference set-up:

Reference set-up: pressure 7.0 bar

Set-up 5: pressure 1.5 bar

For obtaining comparable regeneration results, comparable volumes per filter element of blowback gas had to be delivered to the system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hot gas filtration system comprising
a filter vessel having an interior,
a tubesheet separating the interior of the filter vessel into a clean gas section and a raw gas section, said filter vessel comprising at its raw gas section a raw gas inlet and at its clean gas section a clean gas outlet,
a plurality of filter elements made of ceramic material or metal, and having a raw gas portion and a clean gas end, said plurality of filter elements being arranged in two or more separate groups of two or more filter elements, said filter elements being connected to the tubesheet with their clean gas ends and extending from the tube sheet with their raw gas portions into the raw gas section of the interior of said vessel,
two or more separate plenum chambers accommodated in the clean gas section of the interior of the filter vessel, each separate plenum chamber accommodating the clean gas ends of the filter elements of a corresponding separate group of filter elements, each of said separate plenum chambers comprising a corresponding separate gas exchange opening providing a direct fluid communication of its interior with the clean gas section of the interior of the filter vessel,
a blowback arrangement comprising a blowback gas reservoir, and a separate blowback gas pipe for each corresponding separate group of filter elements, the blowback arrangement delivering non-sonic jet pulses of blowback gas from the blowback gas reservoir via the separate blowback gas pipes into the separate plenum chambers via the corresponding separate gas exchange openings such that a volume of clean gas of the clean gas section is sucked into the separate plenum chambers, said separate blowback gas pipes each having a corresponding separate outlet positioned in said clean gas section of the vessel, said corresponding separate outlet of the separate blowback gas pipes being directed at the corresponding separate gas exchange opening of the separate plenum chambers, wherein said corresponding separate outlet of said corresponding separate blowback gas pipe is positioned flush with the upper end of the corresponding separate gas exchange opening of said separate plenum chamber, wherein a gap is present between each corresponding separate outlet of the corresponding separate blowback gas pipe and the upper end of the corresponding separate gas exchange opening of the separate plenum chamber, the gap allowing the non-sonic jet pulses of blowback gas from the blowback gas reservoir to pass via the separate blowback gas pipes into the separate plenum chambers via the corresponding separate gas exchange openings such that a volume of clean gas of the clean gas section is sucked into the separate plenum chambers, said corresponding separate outlet of said blowback pipe having a free cross-sectional area of from about 15% to about 50% of the free cross-sectional area of said corresponding separate gas exchange opening of said separate plenum chambers.

2. The hot gas filtration system of claim 1, wherein the plenum chamber has a non-circular configuration.

3. The hot gas filtration system of claim 1, wherein each blowback pipe has an inner diameter and wherein the blowback arrangement comprises blowback valves, each blowback valve having a nominal diameter, the ratio of the nominal diameter of each blowback valve to the inner diameter of each blowback pipe being from about 0.8 to about 1.1.

4. The hot gas filtration system of claim 3, wherein the blowback valves have an opening time of about 400 msec or less.

5. The hot gas filtration system of claim 4, wherein the blowback valves have an opening time of about 200 msec or less.

6. The hot gas filtration system of claim 3, wherein the ratio of the nominal diameter of each blowback valve to the inner diameter of each blowback pipe being from about 0.9 to about 1.1.

7. The hot gas filtration system according to claim 1, wherein the system comprises a plurality of safety fuses, each filter element being connected at its clean gas end to one of the safety fuses.

8. The hot gas filtration system of claim 1, wherein the free cross-sectional area of the blowback gas pipe amounts to about 20% to about 40% of the free cross-sectional area of the gas exchange opening of the plenum chamber.

9. A process for regenerating a hot gas filtration system, the system comprising:
   a filter vessel having an interior,
   a tubesheet separating the interior of the filter vessel into a clean gas section and a raw gas section, said filter vessel comprising at its raw gas section a raw gas inlet and at its clean gas section a clean gas outlet,
   a plurality of filter elements made of ceramic material or metal, and having a raw gas portion and a clean gas end, said plurality of filter elements being arranged in two or more groups of two or more filter elements, said filter elements being connected to the tubesheet with their clean gas ends and extending with their raw gas portions into the raw gas section of the interior of said vessel,
   two or more separate plenum chambers accommodated in the clean gas section of the interior of the filter vessel, each separate plenum chamber accommodating the clean gas ends of the filter elements of a corresponding separate group of filter elements, each of said separate plenum chambers comprising a corresponding separate gas exchange opening providing a direct fluid communication of its interior with the clean gas section of the interior of the filter vessel,
   a blowback arrangement comprising a blowback gas reservoir, and a separate blowback gas pipe for each corresponding separate group of filter elements, said separate blowback gas pipes each having a corresponding separate outlet positioned in said clean gas section of the vessel, said corresponding separate outlet of the separate blowback gas pipes being directed at the corresponding separate gas exchange opening of the separate plenum chambers, wherein said corresponding separate outlet of said corresponding separate blowback gas pipe is positioned flush with the upper end of the corresponding separate gas exchange opening of said separate plenum chamber, wherein a gap is present between each corresponding separate outlet of the corresponding separate blowback gas pipe and the upper end of the corresponding separate gas exchange opening of the separate plenum chamber,
   the process comprising the blowback arrangement delivering non-sonic jet pulses of blowback gas from the blowback gas reservoir via the separate blowback gas pipes into the separate plenum chambers via the corresponding separate gas exchange openings such that a volume of clean gas of the clean gas section is sucked into the separate plenum chambers, the gap allowing the non-sonic jet pulses of blowback gas from the blowback gas reservoir to pass via the separate blowback gas pipes into the separate plenum chambers via the corresponding separate gas exchange openings such that a volume of clean gas of the clean gas section is sucked into the separate plenum chambers, said corresponding separate outlet of said blowback pipe having a free cross-sectional area of from about 15% to about 50% of the free cross-sectional area of said corresponding separate gas exchange opening of said separate plenum chambers.

10. The process of claim 9, wherein the jet pulse is provided to a fraction of groups of filter elements during continued filtration operation of the remainder of the groups of filter elements.

\* \* \* \* \*